April 28, 1953

D. E. GRAVES 2,636,459

SEED DEPOSITING MECHANISM

Filed Sept. 9, 1948

Darwin E. Graves
INVENTOR.

BY *James A. O'Brien*
and *Harvey B. Jackson*
Attorneys

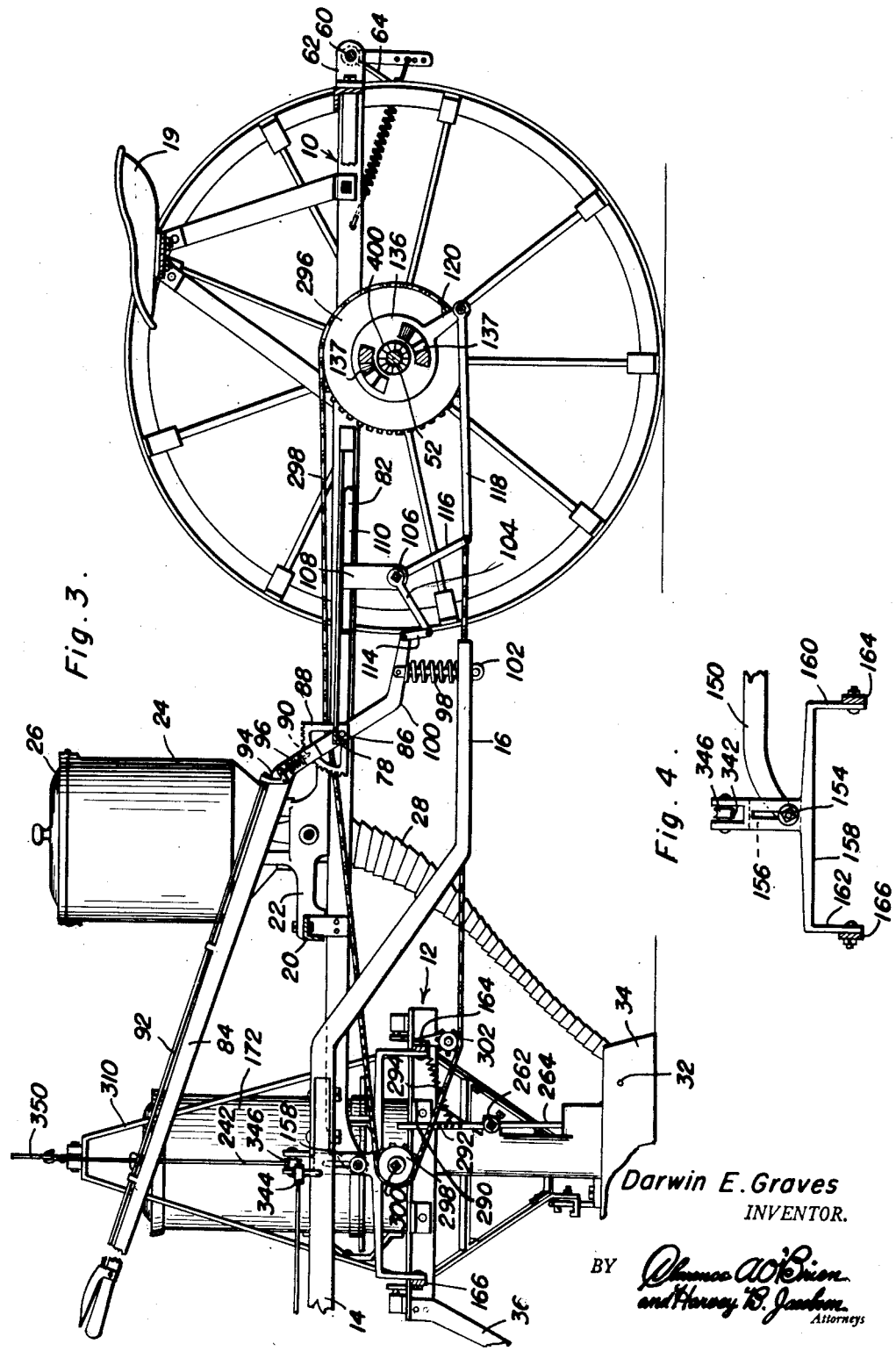

April 28, 1953

D. E. GRAVES 2,636,459

SEED DEPOSITING MECHANISM

Filed Sept. 9, 1948

Darwin E. Graves
INVENTOR.

BY

April 28, 1953

D. E. GRAVES 2,636,459

SEED DEPOSITING MECHANISM

Filed Sept. 9, 1948

Darwin E. Graves
INVENTOR.

BY *Thomas A. O'Brien*
*and Harvey B. Jackson*
Attorneys

April 28, 1953  D. E. GRAVES  2,636,459
SEED DEPOSITING MECHANISM
Filed Sept. 9, 1948  7 Sheets-Sheet 6

Darwin E. Graves
INVENTOR.

BY *Clarence A. O'Brien*
*and Harvey B. Jacobson*
Attorneys

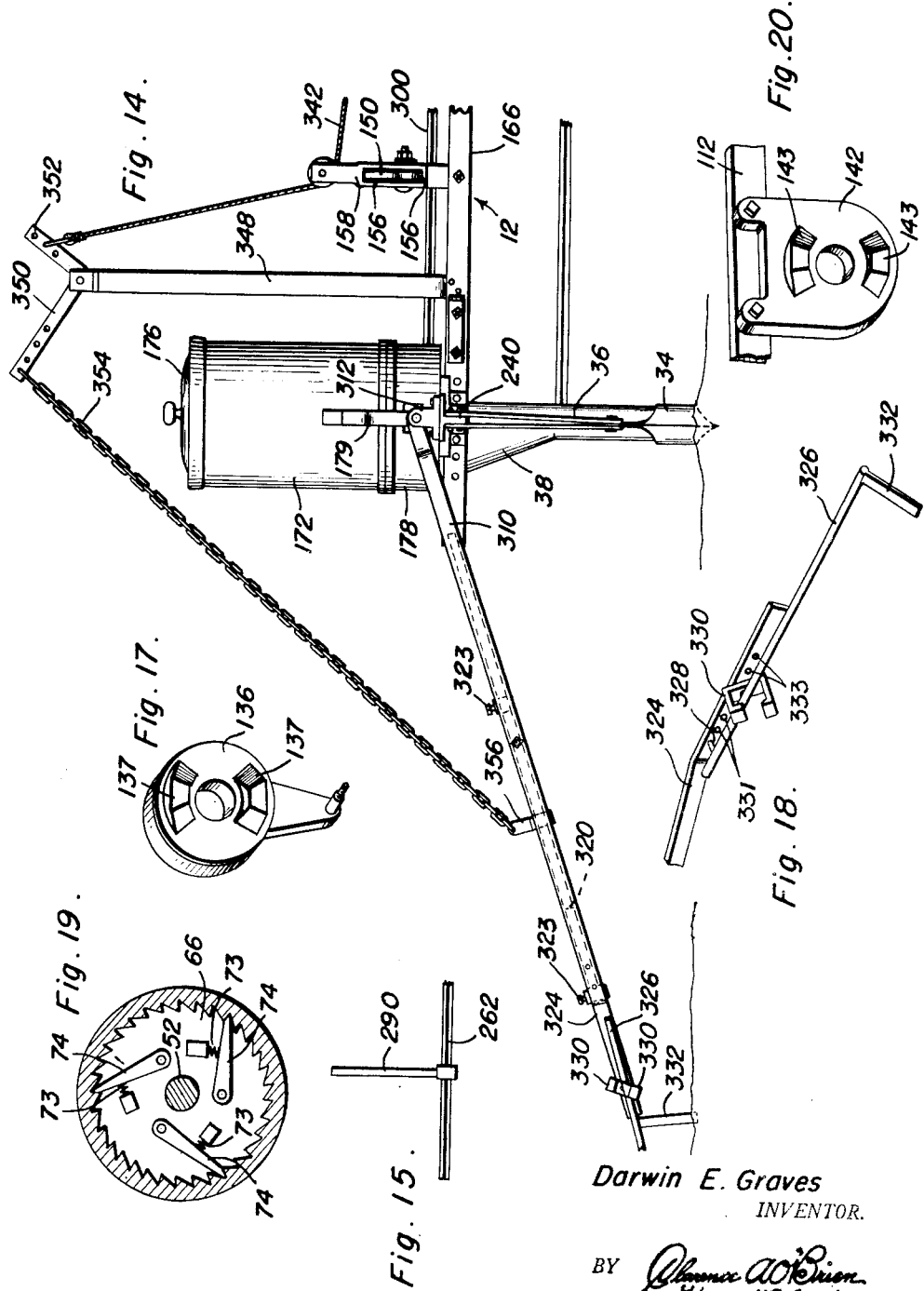

Patented Apr. 28, 1953

2,636,459

UNITED STATES PATENT OFFICE 2,636,459

SEED DEPOSITING MECHANISM

Darwin E. Graves, Solsberry, Ind.

Application September 9, 1948, Serial No. 48,424

1 Claim. (Cl. 111—51)

1

This invention appertains to novel and useful improvements in agricultural implements.

The principal object of this invention is to plant crops—corn, etc., in checked rows without the use of a check wire.

This is made possible as will be seen later on by the seed plate with plurality of seed cups between automatic trip lugs, and connected parts for opening and closing the check gate at regular intervals without the usual check wire. Another purpose of this invention is to house a selective amount of grain in a suitable spout and supply a closure adjacent the bottom portion of the spout, which closure is actuated in accordance with rotation of a distributing plate within a grain bearing hopper.

Ancillary objects and features of novelty will become apparent to those skilled in the art, in following the description of the preferred form of the invention, illustrated in the accompanying drawings, wherein:

Figure 3 is a fragmentary enlarged sectional view of the device illustrated in Figure 1 and taken substantially on the line 3—3 thereof and in the direction of the arrows;

Figure 4 is a sectional view taken substantially on the line 4—4 of Figure 1 and in the direction of the arrows, portions being omitted for clarity and illustrating particularly the support for the frame member;

Figure 1:
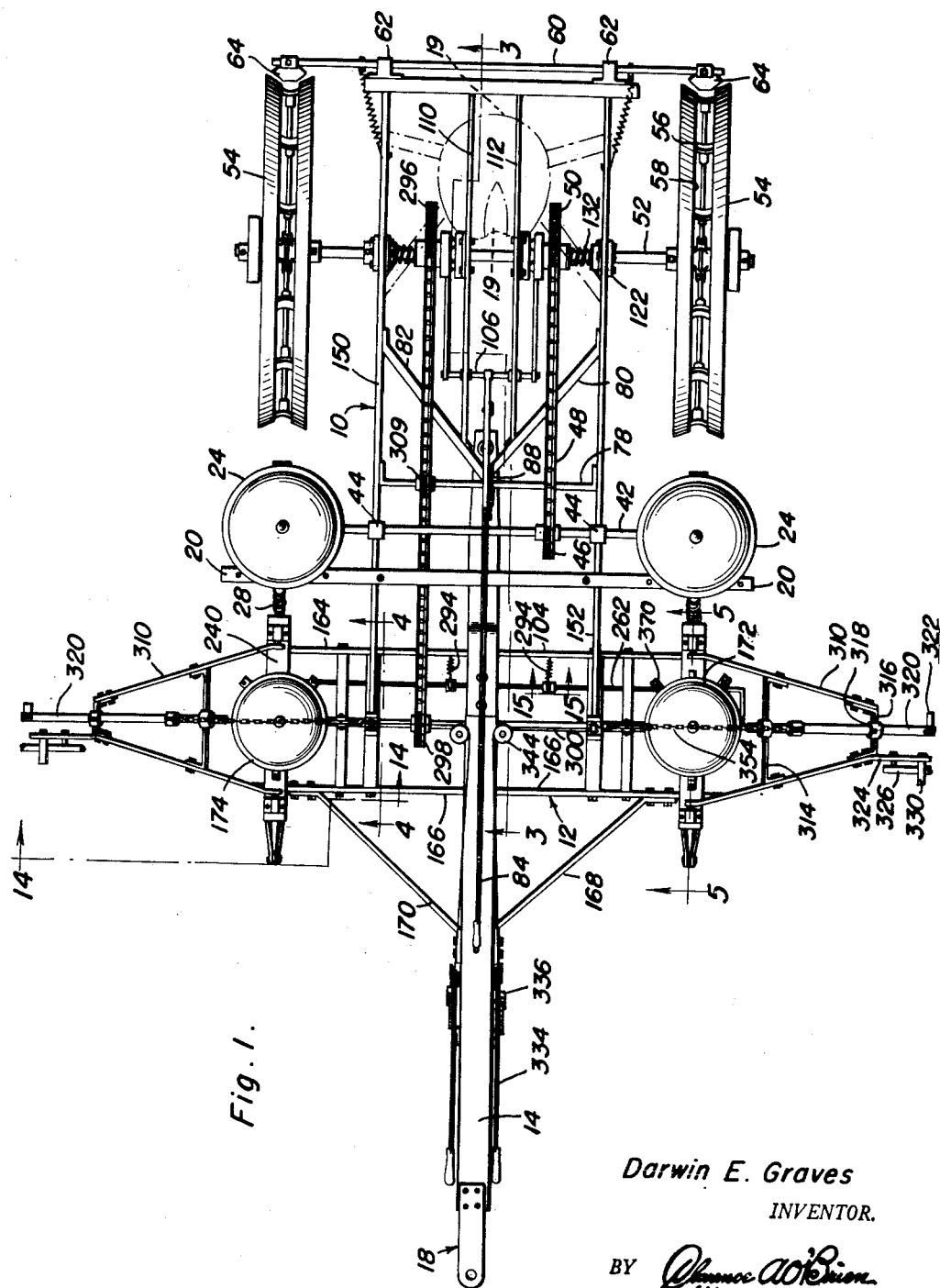
Figure 1 is a plan view of the preferred form of the invention.
Figure 2:
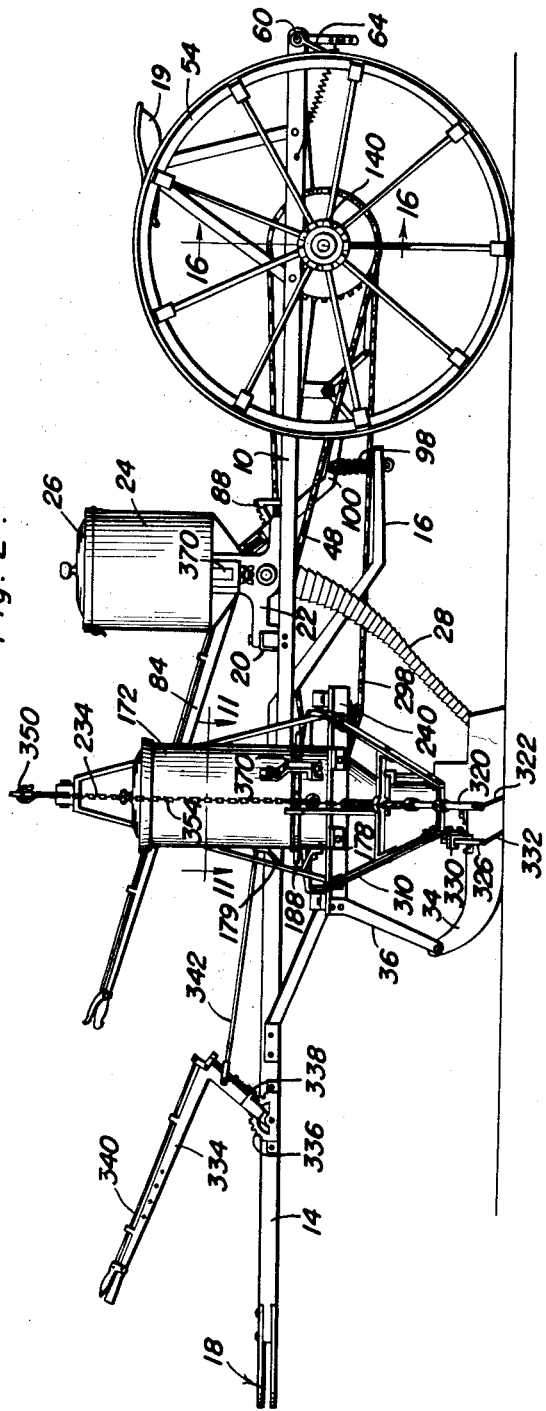
Figure 2 is an elevational side view of the preferred form of the invention.
Figure 16:
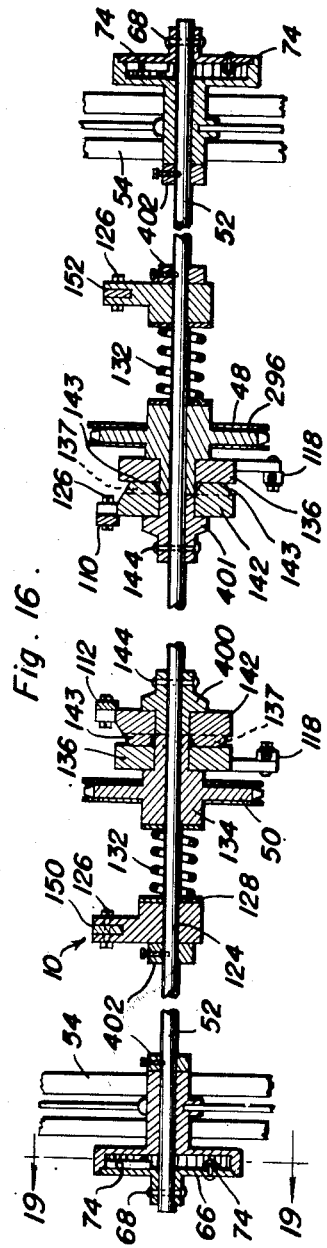
Figure 11:
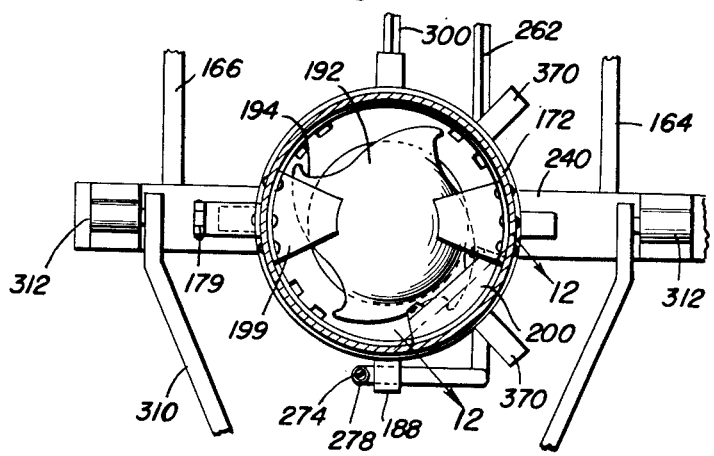
Figure 11 is a transverse sectional view taken substantially on the line 11—11 of Figure 2 and in the direction of the arrows, illustrating particularly the arrangement of the grain distribution means.
Figure 12:
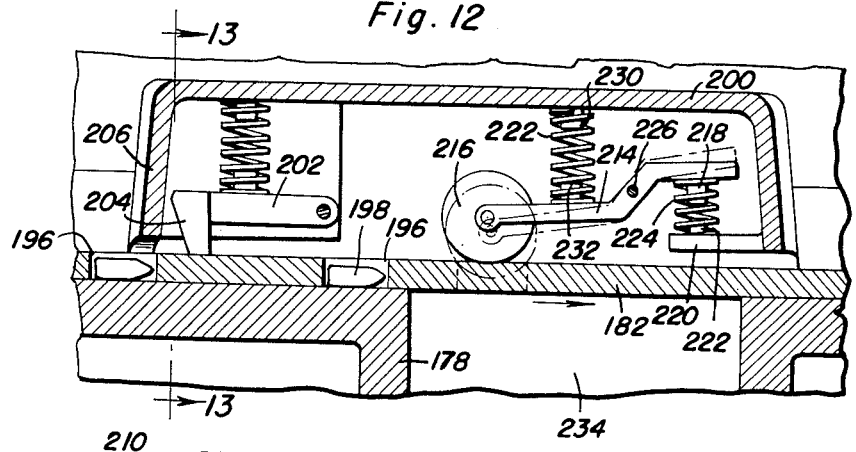
Figure 13:
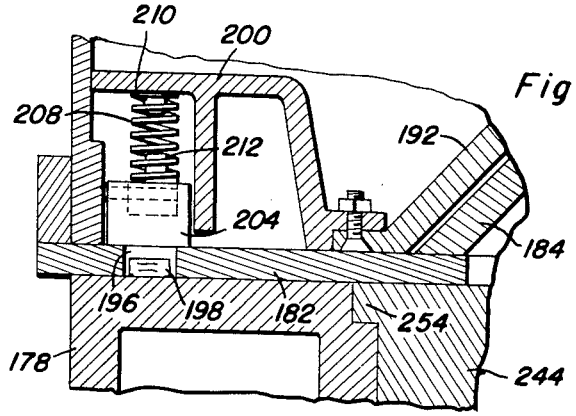

Figure 12 is a fragmentary enlarged sectional view taken substantially on the line 12—12 of Figure 11 and in the direction of the arrows, illustrating particularly a means for deflecting a single grain into one of the apertures in the rotating plate and also the resiliently bias means for urging the seed or grain into the apertures as well as urging it from the apertures for subsequent distribution;

Figure 13 is a sectional view taken substantially on the line 13—13 of Figure 12 and in the direction of the arrows, illustrating details of construction;

Figure 14 is a sectional view illustrating certain details of construction and taken on the line 14—14 of Figure 1 and in the direction of the arrows;

Figure 15 is a sectional view taken substantially on the line 15—15 of Figure 1 and in the direction of the arrows, illustrating the square shaft used in conjunction with the invention;

Figure 16 is a longitudinal sectional view of the rear axle of the implement and taken substantially on the line 16—16 of Figure 2 and in the direction of the arrows;

Figure 17 is a perspective view of the clutch mechanism utilized in association with the grain distributing means and the fertilizer distributing means, and;

Figure 18 is a perspective view showing a single element of the ground marking means;

Figure 19 is a view of the ratchet construction in the hub of each drive wheel showing the ratchet pawls engaging notches in the cut-away hub;

Figure 20 is a perspective view of a clutch element.

A chassis generally indicated at 10 is provided of several structural elements and are made preferably of metal. These structural elements include channels, angle iron members as well as various braces.

A frame generally indicated at 12 is provided transversely on the forward end of the said chassis 10 and is also of metallic construction including a plurality of rods, braces and structural members. Reference is made to Figure 1 wherein this construction is clearly illustrated, showing particularly the relation between the frame 12 and chassis 10, this construction simulating a T.

A tongue 14 (see Figures 1 and 2) is attached to the said frame 12 and chassis 10, terminating in a shelf 16, the function of which will be described later. The forward end of the said tongue 14 may be supplied with any suitable coupling, such as the spaced plates having apertures and indicated generally at 18. This coupling is of course utilized in association with a tractor. For horse drawn type of planter, a longer tongue with neck yoke and doubletrees replaces the stub tongue which is for tractor use only. Also a seat 19 of the usual implement type supported by braces is included.

The two front braces supporting the seat attach to the frame above the axle, and the two rear braces attach one to each rear corner of the frame. This puts the seat above and to the rear of the axle.

For horse drawn type the mechanical parts and principles are the same although there is a different arrangement of those same parts as follows:

The levers 334 are moved on the tongue back of the pulley 344 and the cable 342 is passed around the front of pulley 344 and on back to lever 334. Levers 334 will be nearer straight if necessary for convenience of the operator on the planter when using horses. Lever 84 will be the same below its pivotal point but above its pivotal point it will be made to point backward enough to bring it within easy reach of the operator from his seat on the planter. As can clearly be seen, by changing the position of the parts as above the same mechanical action and control are brought to the operator on the seat of the planter when using horses.

If necessary lever 84 may also be somewhat straighter above its pivotal point to position it in easy reach of the operator on the seat.

An angle iron cross member 20 is attached to the said chassis 10 and extends parallel to the frame 12. This angle iron 20 may be considered a portion of the said frame 12. A pair of identical brackets 22 and identical hoppers 24 are secured to this cross member 20 by any suitable, conventional attaching means. It will be noted that the hopper 24 may be detachably associated with its bracket 22 by means of a wing nut and screw construction. Of course, if it is found desirable the hoppers may be rigidly associated with the cross member 24, this being a matter of choice.

A cover 26 may be supplied on the hoppers 24 for the obvious purpose of retaining the fertilizer used in association therewith.

Figure 5:
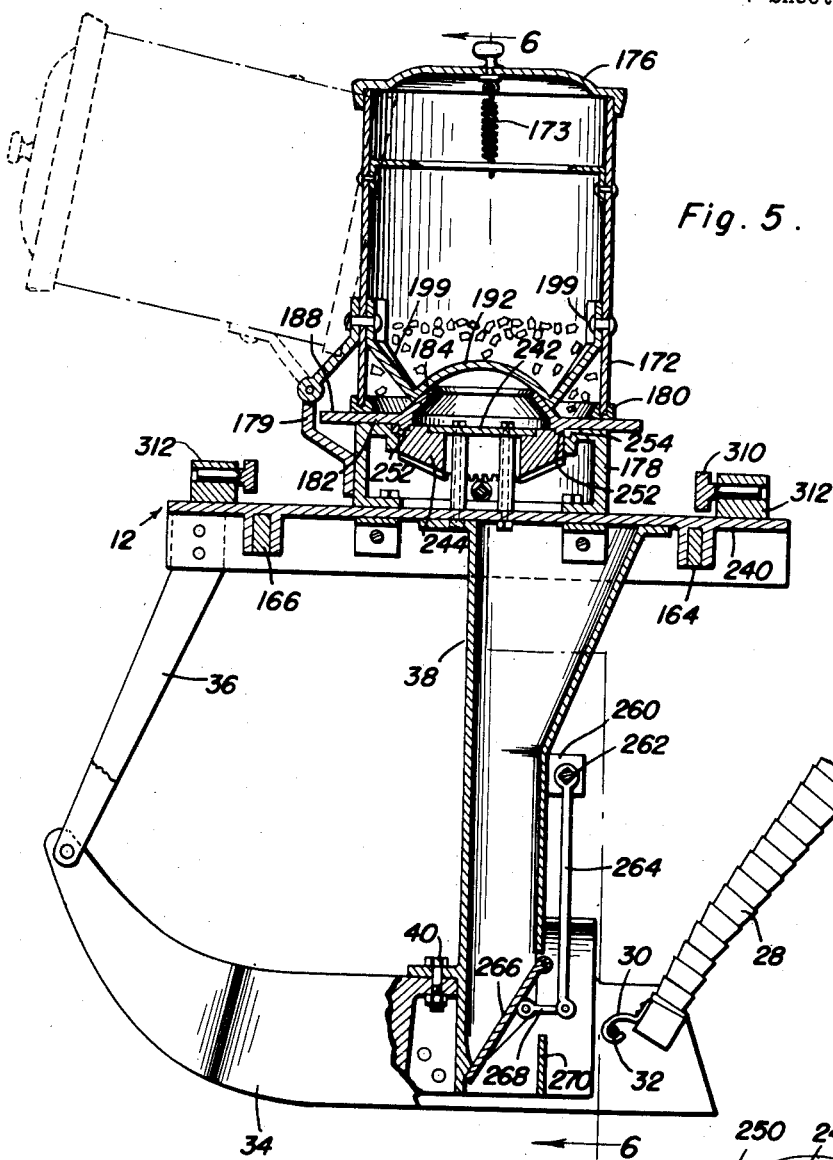
Figure 5 is a sectional view taken substantially in the line 5—5 of Figure 1 and in the direction of the arrows, portions being enlarged for clarity.
Figure 10:
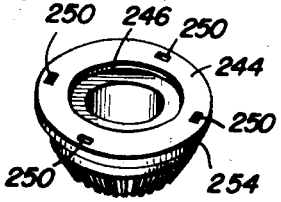
Figure 10 is a perspective view of a gear used for actuating the plate.

A flexible spout 28 extends from the lower portion of the hopper 24 and may have a hook 30 associated with the terminal portion thereof. This hook attaches to a suitable pin 32 which is secured to a shoe 34. This shoe is utilized for the purpose of digging a furrow in the ground prior to planting and other agricultural operations. As is seen in Figure 5, the said shoe is attached to the frame 12 by means of a support bracket 36 and is also retained in the proper position through the medium of a spout 38, which is attached to the lower portion of a suitable element of the frame 12. The function of this spout 38 will be described subsequently. Of course, suitable bolts 40 may be utilized in connecting the shoe to the spout 38 and if desired, other conventional fastening means may be utilized. A preferred form of fastening the shoe to the spout 38 is by rivets crosswise through the shoe and the lower forward part of the spout 38 designated as the frog.

Referring now to Figure 1 it will be noted that a shaft 42 extends from the hoppers 24, connecting the two. This shaft is journaled in suitable, conventional bearings 44 which are attached to the chassis 10. Further, a conventional mechanism is supplied in each hopper 24 for distributing fertilizer. Various types of fertilizer distributing means may be utilized, it being but a matter of choice of a conventional apparatus.

A sprocket 46 is rigidly attached to the said shaft 42 and has a chain 48 extending therearound. This chain also extends around a complemental sprocket or gear 50 which is associated with a clutch mechanism.

It is noted that two identical clutch mechanisms are provided on the axle 52, which axle is journaled in the said chassis 10. Further, wheels 54 having dished central portions 56 with spaced slots 58 in the dished portion, are provided on the said axle 52.

The utility of two identical clutch mechanisms is for the purpose of actuating the fertilizer distributing means and the grain distributing means when desired by the operator of the invention.

A bar 60 is attached to suitable bosses 62 on the said chassis 10 and small scrapers 64 are attached to this bar, the said scrapers 64 being in juxtaposition to the wheels 54. Of course, the scrapers are adapted to and actually scrape any excess material which might adhere to the running surface of the wheels.

In order to prevent the possibility of reverse actuation of the grain and fertilizer distributing means, a ratchet type mechanism is utilized for the purpose of locking the wheels to the axle 52 in only one direction of rotation of the said wheels. For detail of this construction, reference is made to Figure 16 wherein there is illustrated a flanged ratchet hub or collar 66 rigidly attached to the said axle 52 by means of a conventional pin or bolt 68. Also attached to the flange of hub 66 through the medium of a rivet inside of and extending through a spacer sleeve is a ratchet pawl or dog 74 which is pivotally associated with the flange of ratchet hub 66. Associated with the above pawl or dog 74 is a compression spring 43 which constantly urges the above pawl or dog 74 to a pivotal action which forces the free end of said pawl or dog 74 outwardly causing said pawl 74 to engage any one of a plurality of notches (unnumbered) in the hub of the drive wheel 54 in which pawl 74 is housed, which with two other pawls 74 on 66 having the same construction and action lock the drive wheel 54 to the axle 52 when said drive wheel 54 is rotated in a forward action, such as pulling the chassis 10 forward. But when the drive wheel 54 is rotated in a reverse action by backing the chassis 10 or otherwise rotating the drive wheel 54 reversely, above said notches in hub of wheel 54 slide harmlessly over said pawls 74, and do not cause the axle 52 to rotate reversely. By the above it is apparent that the drive wheel 54 can activate the axle 52 only in a forward rotation. There is also a like arrangement of the same parts for the other drive wheel 54.

Since the flanged collar of hub 66 (with the pawls 74 attached thereto) is rigidly attached to the axle 52 the pawls 74 rotate around with the axle 52 and wheel 54 when the wheel 54 travels in a forward rotation.

When the wheel 54 rotates in a forward rotation, said wheel 54 is locked to the axle 52 by the pawls or dogs 74. Yet the same pawls 74 prevent the axle 52 from rotating reversely when the wheels 54 rotate in a reverse action, as in backing at ends of rows, etc.

A cross member 78 (see center of Figure 1) is integrally associated with the said chassis 10 and forms a part thereof. This cross member acting in conjunction with truss elements 80 and 82 respectively assist in seating a handle 84 which is of bell crank configuration. This handle 84 is pivoted by means of a conventional pin 86 and is utilized ultimately for the purpose of actuating the clutch mechanisms on the axle 52 and raising and lowering the shoes 34 as desired in turning or traveling.

A gear segment (see Figures 3 and 1) 88 is attached to the cross member 78 and has a latch keeper 90 associated therewith. This latch keeper is of course slidably secured to the said handle 84 for engagement with selected teeth of the segment 88. A conventional keeper actuating rod 92 is associated with the handle 84 and the usual bell crank 94 is attached to the rod 92 for urging a resiliently biased element against the keeper 90. The small spring 96 is utilized for the requisite resiliently in this connection.

Seated on the said platform 16 (mentioned above) is a spring 98 which also engages an extension 100 of the said handle 84. A guide rod 102 is pivoted to the extension 100 and is slidably received through a suitable aperture in the platform 16. The end of the guide rod 102 may be bent or otherwise modified to prevent excess movement thereof.

An arm 104 is attached to a preferably square shaft 106 which is journalled in and supported by perches or brackets 108. These brackets are attached to rods 110 and 112 respectively which form a portion of the chassis 10. The said arm 104 also connects with the handle 84 and more specifically to the extension 100 through the medium of a pitman 114. It may now be readily appreciated that upon actuation of the handle 84 pivotally about the pin 86, the shaft 106 will be rotated.

Connected to the said shaft 106 is an arm 116 which has a pitman 118 associated with one end thereof. The other end of the said pitman 118 terminates pivotally on a wrist which is on a lever like projection of plate 136. A wear sleeve or bushing is on the above wrist where pitman 118 slips on the above wrist. Said lever like projection of plate 136 extends downward and backward at an angle of 45° to make a lever which throws the clutch in or out of gear when activated by the lever 84 and above connected parts. It will be noted from an inspection of Figure 1 that there are two such assemblies that is mating pairs of links 116, 118 and lever projection of plates 136. This of course is to actuate both clutch mechanisms as is seen in Figure 16.

The specific clutch arrangement is of the resiliently bias type as is readily apparent from the clutch detail. A bracket 122 having a bore 124 therein is utilized for journalling the shaft 52. This bracket is rigidly secured to the members 150 or 152 of the chassis 10 by means of bolts 126. Of course, as is seen in Figure 16 there are two identical supporting brackets 122 used in this construction.

A bearing plate 128 encircles the said shaft 52 and engages a face of the bracket 122. Then, a suitable resilient means for biasing purposes, such as the coil spring 132 is supplied about the shaft 52, seated upon the said bearing plate 128. The opposite end of the spring 132 engages a boss 134 which is formed integral with said gear or sprocket 50. By this construction the said gear 50 is constantly urged in a selected direction.

A plate 136 fits loosely around the reduced end of the hub of sprocket 50, and plate 136 also fits loosely against a shoulder on the hub of sprocket 50. Plate 136 remains stationary while sprocket 50 rotates when in gear. The reduced end of the hub of sprocket 50 is long enough to extend through plate 136 and permit the teeth on the end thereof to engage the teeth on the reduced end of the hub 400 which extends through plate 142. Hub 400 is rigidly attached to the axle 52 by bolt 144. Plate 136 has two lugs 137 on the face thereof next to plate 142 which also has two lugs 143 that oppose the lugs on 136. When plate 136 is activated in a rotation of 45° by pitman 118 bringing the lugs of plate 136 against the like lugs 143 on the plate 142 which action presses sprocket 50 back against the spring 132 far enough to disengage the teeth on the end of the reduced hub of the sprocket 50 from the teeth on the reduced end of hub 400. This puts the clutch out of gear and renders the mechanism of the planter inoperative.

The second plate 142 which is different from plate 136 is rigidly secured to frame member 112 by two bolts in the left clutch, and said plate 142 is rigidly secured to frame member 110 by two bolts in the right clutch when viewed from the rear as in Figure 16. The second plate 142 also has a hole through it like plate 136 and for the same purpose of letting the reduced end of hub 400 with teeth on the end thereof extend through a hole in 142 to engage the teeth on the reduced hub of the sprocket 50 which extends through plate 136.

The lugs on the second plate 142 are one directly above the center of the axle 52 and one directly beneath the center of said axle 52. When in gear, the upper and front lug on plate 136 is just below and forward of the upper lug on plate 142, and the lower and rear lug on plate 136 is above and to the rear of lower lug on plate 142 when in gear.

One end of the link 118 is pivotally attached to link 116. The other end of 118 is pivotally attached to the lever like part of plate 136 whereupon actuation of handle 84 causes link 118 to pull on lever part of plate 136 which rotates plate 136 45°, which as previously explained disengages the teeth on hub 400 from the teeth on sprocket 50. By this means the clutch assembly is produced and the fertilizer or grain distributing means is rendered operative or inoperative. The construction of the other clutch is the same as the above described parts.

Means for supporting the frame 12 on the said chassis 10 is provided and illustrated at Figures 3 and 4 particularly. The side members 150 and 152 respectively of the said chassis 10 terminate in an arcuate portion which has a pin 154 extending therethrough. This pin is seated in a slot 156, formed in a bracket 158 having bifurcations 160 and 162 respectively. These bifurcations are attached to bracing elements 164 and 166 respectively which form a portion of the frame 12. By this construction it is apparent that the frame 12 is supported rather freely in a lost motion connection. This allows the shoe 34 to ride up and down slightly along with the frame 12. Brackets 168 and 170 respectively are attached to the tongue 14 and to the frame element 166 by suitable means such as bolts or rivets. Further, it is within the purview of the present invention to rigidly attach the frame 12 to the chassis 10 to obviate such rising and falling of the frame 12 relative to the chassis. The tongue 14 is rigidly attached to frame element or cross member 166 by a clamp or bolts. Tongue 14 is similarly attached to frame member 164 where they cross. This makes the tongue 14 rigid with both 164 and 166.

Means for distributing grain or seed is associated with the said frame 12 and will be described in detail at this time. A pair of hoppers 172 and 174 are provided at opposite terminals of the frame 12 and closures 176 are provided on each hopper for retaining the grain therein. A spring 173 is attached to the inside center of hopper cover 176 and down on the inside of the hopper 172 to constantly pull down on closures 176 thus keeping the hopper 172 tightly covered by closures 176 to keep rain, etc., out of the hopper and also to prevent 176 losing off. A hollow support 178 is attached beneath the hopper body member and forms a portion of the said hopper. It will be noted that the two hoppers 172, 174 illustrated are of identical construction and the pertinent mechanism associated therewith is also identical. Therefore, it is believed that a description of one hopper with its associated mechanism will suffice for a clear understanding of the other illustration.

Figure 3 clearly disclosed that the upper portion of the said hopper 172 is hingedly mounted through the medium of the bracket 179 which is attached rigidly to the base block 178 and its pivotal point or hinged joint is level with the top of plate 182 which will raise the hopper 172 clear of plate 182 when hopper 172 is tilted. This, of course, renders access to the internal portions of the hopper.

Figure 9:
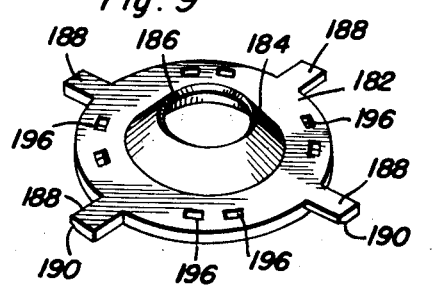
Figure 9 is a perspective view of a rotating distributing plate utilized in the grain hopper.

A seal 180 may be attached to the lower portion of the upper segment of the hopper 172, serving the usual sealing function. Further, a plate 182 (see Figure 9) having a frusto-conical central portion 184 with an aperture 186 therein is provided on the bearing block 178. A plurality of projections or lugs 188 having a bevelled edge 190 on each, is provided about the periphery of the plate 182, the said lugs extending outwardly of the hopper 172.

Reference is now made to Figure 11 wherein a baffle 192 is illustrated as seated upon the frustoconical central portion 184. This baffle has dished leading edges 194 utilized for the purpose of urging grain, such as corn, to the internal periphery of the hopper 172. The grain is urged toward the successive apertures 196 which are provided in the plate 182.

The apertures 196 are of such size as to conveniently receive a single grain of corn or the like 198 therein.

Positioned above the baffle 192 is a plate 199 which is permanently attached to the side of the hopper 172, which plate is utilized for maintaining the baffle 192 in a position which is immovable relative to the hopper 172. Two other braces rising from the baffle 192 are also part of said baffle 192 and are so positioned on the baffle 192 that they are connected by rivets through the side of hopper 172 to the braces 310 which are on the outside of the hopper 172. The above three braces are part of the baffle 192 which they support, and prevent friction of the baffle 192 on plate 182 when hopper 172 is full of seed.

A housing 200 is attached to the said baffle 192 and has a pair of mechanisms therein. The first mechanism consists of a pivoted arm 202 having a scraper 204 associated therewith. This scraper engages the upper portion of the plate 182 for insuring the positioning of a single grain of corn 198 in each aperture 196. The edge or side wall 206 of the said housing 200 is positioned above the plate 182 a sufficient distance as to obviate the possibility of a whole grain of corn from slipping within the housing 200. Further, the arm 202 with its scraper 204 urges the grain of corn within the aperture and obviates the possibility of an additional grain being present in a single aperture 196. A spring 208 is seated on a pair of opposed lugs 210 and 212 respectively, which are attached to the arm 202 and the upper portion of the housing 200. This construction of course constantly urges the arm 202 against the upper surface of the plate 182.

Juxtaposed relative to the aforementioned assembly is a second assembly including a pivoted arm 214, associated with one wall of the housing 200. A roller 216 is attached to one end of the said arm 214, while the other end of the arm has a lug 218 secured thereto. A shaft 220 is formed integral with the housing 200 and has a lug 222 seated thereon. Encircling the lugs 218 and 222 is a spring 224 or some other suitable, equivalent resilient biasing means, for urging the arm 214 pivotally about the pin 226. Of course, the pin 226 is utilized in pivotally supporting the arm 214 on the housing 200. Further, to assist in urging the roller 216 in the successive apertures 196, an additional spring 228 is seated on the housing cover 200 and the arm 214. The usual lugs 230 and 232 respectively may be attached to the housing and arm respectively to obviate creep of the spring.

In actuation of the plate 182, the corn or other grain is first received in the successive apertures from the supply within the hopper 172, then smoothed within the apertures so that a single grain may be maintained solely, and then, is urged by the roller 216 through the said apertures 196 to and through a passage 234.

This passage extends through the upper wall of the bearing block 178 then proceeds to a funnel or spout 236 which is attached to the cross member 240 which forms a portion of the frame 12. Of course, suitable bolts may be utilized in this connection, which bolts may be extended through the bearing block 178 to the disc 242.

Figure 6:
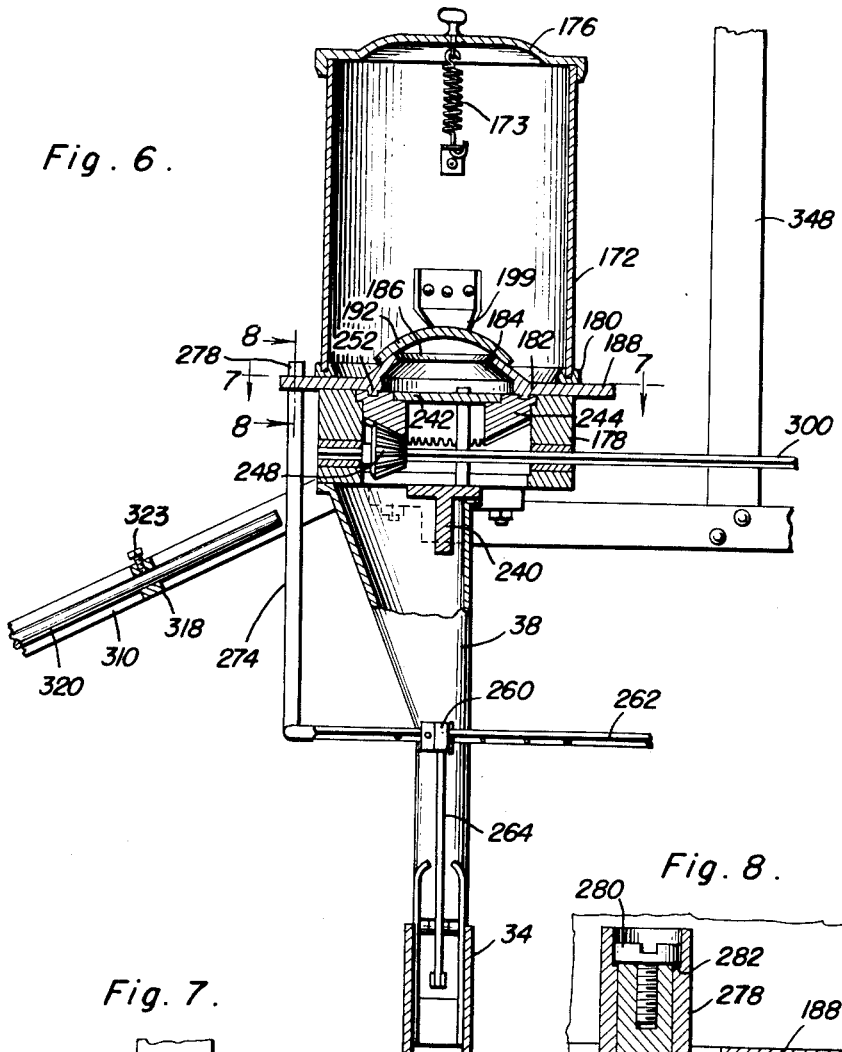
Figure 6 is a sectional view taken substantially on the line 6—6 of Figure 5 and in the direction of the arrows.
Figure 7:
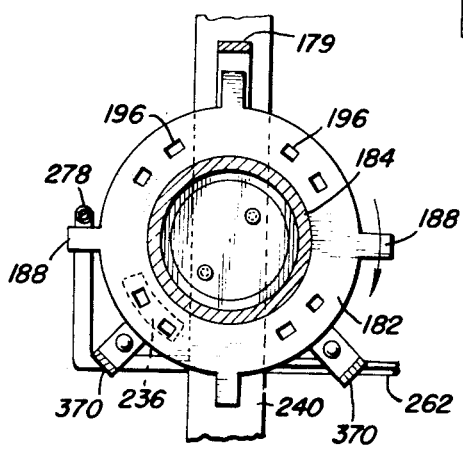
Figure 7 is a sectional view taken substantially on the line 7—7 of Figure 6 and in the direction of the arrows.
Figure 8:
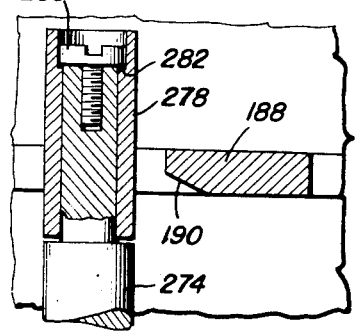
Figure 8 is a sectional detail of construction taken substantially on the line 8—8 of Figure 6 and in the direction of the arrows, illustrating particularly a bearing utilized in association with the invention.

The said disc 242 is utilized to maintain a gear 244 in the proper position with the bearing block 178. The function of the said gear 244 is as follows: A recess 246 is supplied therein, wherein the disc 242 is seated. The said gear 244 is of the bevel type and reference to Figure 6 illustrates the complemental bevel gear 248 cooperating therewith. Rotation of the bevel gear 248 produces rotation of the said bevel gear 244. Positioned about the upper surface of the said gear 244 is a plurality of apertures 250 which accommodate lugs 252, depending from the lower surface of the plate 182. A peripheral flange 254 is supplied on the said gear 244 and engages a shoulder formed in the bearing block 178 for seating purposes. This construction prevents downward movement of the gear 244 and the disc 242 prevents upward movement. The circular configuration of the gear cooperating with the circular aperture therefore prevents lateral movement. By this construction it will be seen that the gear is rotatably seated in the bearing block and also, as the said gear is actuated the plate 182 is driven.

Referring now to the spout or funnel 38 wherein the grains of corn or the like are dropped prior to dispensing, it will be seen that the lower portion thereof is attached to the shoe 34 by the rivets as described hereinbefore. A bracket 260 is rigidly attached to one wall of the said chute 38 and is used for journalling the shaft 262 therein. This shaft 262 is preferably square in cross section and has an arm 264 attached thereto. This arm is connected with a pitman 268 which is also connected with the check gate 266 and which is in turn pivoted to one wall of the chute 38. The closure restricts the passage of the chute for maintaining a charge or supply of seed or grain therein prior to dispensing the same. The connection between the arm 264 and the closure 266 may be made by means of the pitman 268. Also, a stop 270 may be supplied in the shoe 34 for limiting the travel of the closure which also protects the closure 266 from dirt, etc., interfering with its action in opening and closing.

The operation of the shaft 262 is controlled by the movement of the plate 182 and more specifically by engagement of the lugs 188 with the right angular extension 274 of the said shaft 262. Since the square shaft 262 is pivoted in the flange or bracket 260, the right angular extension projects adjacent the hopper 172 whereupon movement of the plate 182 will urge the lugs into engagement with a bearing or wear plate 278 formed on the extension 274. This wear plate may be in the form of a sleeve seated in the reduced portion of the extension 274 and a suitable screw 280 may be used for attaching the sleeve 278 to this reduced portion. Of course, a suitable shoulder 282 may be formed in the bore of the sleeve 278 whereby firm grip of the head of the screw 280 may be made.

Referring to Figure 6 it will be clearly evident that upon rotation of the plate 182, the lugs 188 will urge the extension 274 in such a manner as to oscillate the shaft 262, thereby opening and closing the closure 266.

Referring to Figure 3 attention is directed to the square shaft 262. It will be noted that a rod 290 is attached thereto. A plurality of apertures 292 are formed in the said rod or arm 290 wherein a spring 294 may be selectively attached. The other end of the spring is suitably attached to the frame member 164 and of course, the said spring 294 constantly urges the rod in a single direction. As the rod 262 is actuated and therefore the closure 266 is selectively opened and closed, the rod 290 will oscillate. This gives an indication of operability of the closure and therefore an indication of the depositing of a hill of seed in the furrow or trench made by the shoe 34. Of course, the said rod 290 is utilized as an indication and may be painted or otherwise colored to attract the eye and also to distinguish it from various mechanical elements readily and rapidly.

A sprocket 296 is attached to the axle 52 and this sprocket is identical to that sprocket member 50 except the configuration of the teeth on sprockets 50 and 296 makes then non-interchangeable. A chain 298 extends around the said sprocket 296 and around a complemental sprocket 298. This complemental sprocket 298 is attached to a shaft 300, which shaft 300 has the above described gear 248 attached thereto. It is apparent that actuation of the shaft 300 renders operative both hoppers and their distributing mechanisms. Suitable idler gears 302 and 304 respectively may be supplied in the chain system for tightening purposes as well as for attaining the proper positioning.

Secured to the frame member 240 is a support 310. This support is composed of suitable bracing members, having one pair of ends attached to the brackets 312 which seat upon the frame member 240. A pair of cross members 314 and 316 respectively are utilized in the make-up of the support 310 and have bearings 318 formed therein. These bearings support a rod 320 by means of suitable set screws 323 and of course, the rod is extensible relative to the support. At the terminal portion of the said rod 320 is a scraper 322 which is adapted to engage the ground during operation of the device. This applies a mark to the ground indicating the travel of the attachment for farm use. Since this arm 320 is extensible, the adjustment which is necessary for the particular operations at hand may be made.

Also attached to the support 310 is a perch 324 having an arm or rod 326 pivoted thereto, through the medium of a conventional pin 328. Means for limiting the pivotal travel of the said arm 326 is provided. Rod 326 is also extensible by a plurality of holes 331 in the perch 324. Also since the support 310 contains two separate marker rods 320 and 326, and as 326 is always extended farther than 320 it is necessary that supports 310 be practically level when the markers 322 and 332 are on contact with the soil. This can be accomplished preferably by having supports 310 curved between cross member 314 and the two ends thereof of members 310 that attach pivotally to brackets 312. This is preferred to making the markers 322 and 332 long enough to level up 310 as they would bend badly. Since the marker 326 is always extended farther than the marker 320 the necessity of supports 310 being practically level when in use is apparent. A limiting means may be seen as the partially closed U-shaped member 330 which may be attached to the perch 324 by means of a conventional bolt and nut construction. Through this expedient the substantially U-shaped member 330 may be adjustably rotated thereby permitting larger or smaller travel of the rod 326. Further pivotal control of rod 326 may be made by changing the bolt holding the U-shaped member 330 to different matched holes 333 in the perch 324.

The pivotal movement in this marking device is desired in order that the marker 332 may follow the terrain, thus compensating for slight depressions and hills.

Inspection of Figure 1 clearly discloses that there are two identical assemblies as described, one extending from each side of the substantially rectangular shaped frame 12.

Means is provided for raising and lowering each of the supports 310 and the pertinent mechanism maintained thereon. The preferred means may be seen by correlating Figures 1 and 14. It will be seen that a crank-type handle 334 is pivoted to the tongue 14 and has a gear segment 336 associated therewith. The gear segment is of course stationarily attached to the tongue 14 and a latch keeper 338 is attached to the handle 334. This latch keeper is resiliently biased and controlled by a rod 340 which is positioned on the handle 334. Actuation of this latching means permits the handle to be maintained in several adjusted positions in accordance with the shape of the gear segment 336.

A cable 342 is attached to the handle 334 and extends around a suitable pulley 344, which is secured to the said tongue 14. The cable 342 then extends to another pulley 346 in its travel. This last mentioned pulley is attached to the bracket 158 and journalled by a conventional pin or shaft.

A support 348 has a bell crank 350 journalled at the end thereof and the cable 342 terminates in a suitable aperture 352 supplied in the said bell crank. The preferred connection is by means of a detachable ring, which ring may be supplied in any one of a selected member of apertures to effect adjustment when necessary. The opposite end of the bell crank has a chain 354 attached thereto. This chain of course may be substituted for ropes, cable or the like. The opposite end of the said chain 354 is attached to a suitable bracket 356 which is in turn supported and connected to the said support 310. It may now be appreciated that by actuation of the handle 334, the cable 342 will be urged in a selected direction, thereby pivoting the bell crank 350 and lifting the said support 310 to the inoperative position. Further, the support may be maintained in this inoperative position by utility of the gear segment 336 and its pertinent latching means, attached to the handle 334.

Inspection of Figure 4 clearly illustrates that there are two identical constructions for raising and lowering the identical supports 310. Therefore, a further description of the opposite identical raising and lowering means is deemed unnecessary.

Referring now to Figure 2 it will be noted that pivotal latches 370 may be provided from the upper section of the hopper 172 to the lower bearing block 178. This of course cooperates with the hinge 179 for retaining the upper and lower segments of the hopper in place. Further, this latch is of the quick detachment type whereby pivoting the top section of the hopper 172 is rendered simple.

While there has been described and illustrated but a preferred form of the invention, it is apparent that variations may be made without departing from the spirit thereof. Accordingly, limitation is sought only in accordance with the scope of the following claim.

Having described the invention, what is claimed as new is:

In a planter which includes a mobile chassis and an element rotatable at a speed proportionate to the speed of the chassis, a seed depositing mechanism comprising a hopper, a seed plate mounted for rotation about a vertical axis and rotated by said element, a generally vertical spout receiving seed from said plate and having a discharge opening at its lower end, a closure pivoted on said spout for closing said discharge opening, said plate having a plurality of projections spaced around its periphery, said projections extending through a passageway in said hopper to the exterior of said hopper, a horizontal shaft carried by said chassis, a depending arm fixed at its upper end to said shaft, the lower end of said arm being linked to said closure, an upstanding member spaced from said arm and fixed at its lower end to said shaft, the upper end of said member being disposed in the path of movement of said projections to be contacted and swung by said projections to rock said shaft, and yielding means connected with said shaft opposing rocking of said shaft and normally holding said closure in position closing said discharge opening, whereby in response to rotation of said seed plate said closure is periodically actuated to open said discharge opening and deposit seed.

DARWIN E. GRAVES.

References Cited in the file of this patent
UNITED STATES PATENTS

| Number | Name | Date |
|---|---|---|
| 229,985 | Everett | July 13, 1880 |
| 395,602 | Watson et al. | Jan. 1, 1889 |
| 504,321 | Bowser | Sept. 5, 1893 |
| 536,330 | Evans | Mar. 26, 1895 |
| 648,260 | Holum | Apr. 24, 1900 |
| 695,042 | Gedge | Mar. 11, 1902 |
| 738,035 | Hendrickson | Sept. 1, 1903 |
| 743,949 | Stevens | Nov. 10, 1903 |
| 960,444 | Tucker | June 7, 1910 |
| 1,058,054 | Hallenbeck | Apr. 8, 1913 |
| 1,073,826 | Waite | Sept. 23, 1913 |
| 1,078,395 | Watson | Nov. 11, 1913 |
| 1,092,007 | Bartholomew | Mar. 31, 1914 |
| 1,131,897 | Bartholomew | Mar. 16, 1915 |
| 1,195,879 | Van Brunt | Aug. 22, 1916 |
| 1,327,455 | Willis et al. | Jan. 6, 1920 |
| 1,398,428 | Golle | Nov. 29, 1921 |
| 1,420,465 | Arnold | June 20, 1922 |
| 1,650,808 | Van Brunt | Nov. 29, 1927 |
| 2,068,382 | Kriegbaum | Jan. 19, 1937 |
| 2,340,163 | White | Jan. 25, 1944 |
| 2,362,693 | Haas | Nov. 14, 1944 |
| 2,371,827 | Kriegbaum | Mar. 20, 1945 |